United States Patent [19]

Thomason

[11] 4,284,059

[45] Aug. 18, 1981

[54] HEAT STORAGE AND HEAT EXCHANGER

[76] Inventor: Harry E. Thomason, 6802 Walker Mill Rd., SE., Washington, D.C. 20027

[21] Appl. No.: 720,355

[22] Filed: Sep. 3, 1976

[51] Int. Cl.³ .............................................. F24J 3/02
[52] U.S. Cl. .................................... 126/415; 126/426
[58] Field of Search .................. 165/46, 169; 126/270, 126/271, 377, 378, 415, 426; 4/172.11, 172.12, 172.13, 172.14

[56] References Cited

U.S. PATENT DOCUMENTS

| 3,022,781 | 2/1962 | Andrassy | 126/271 |
| 3,091,777 | 6/1963 | Pearlson | 4/172.13 |
| 3,598,104 | 8/1971 | Trostler | 126/271 |
| 3,816,859 | 6/1974 | Mosehauser | 4/172.11 |
| 3,871,033 | 3/1975 | Bartlett | 4/172.13 |

Primary Examiner—Carroll B. Dority, Jr.

[57] ABSTRACT

Storage of energy is desirable for many purposes, such as heat energy produced by sunshine or by conventional energy sources during periods of off-peak demand. In the present case, heat energy is brought into a storage area by way of a "pillow" or quilted blanket-like device that has large storage space within itself and which, in addition, serves as a large heat-exchanger to impart its heat to other storage material within a container.

The "pillow" or quilted blanket-like device is generally used to transfer heat into storage, to warm a swimming pool, for example. It could be used to extract heat from storage in cases where it is desired to store coolness.

The low-cost materials used make it practical to have large quantity heat storage, large area heat-exchange surfaces, plus safety features such as protection for divers' heads, knees and elbows against concrete pool bottoms, plus decorative benefits such as beautiful pool bottoms or pool walls or both.

13 Claims, 5 Drawing Figures

HEAT STORAGE AND HEAT EXCHANGER

BACKGROUND AND BRIEF SUMMARY

In recent years efforts have been made to warm swimming pools, and liquids in other containers, by solar energy and heat energy that is available at low cost during off-peak periods. But, then came the problems.

Copper solar heat collectors are expensive. Dr. John I. Yellott (Arizona State University) reported that even copper collectors were short-lived as he started solar heating his pool. The chlorinated pool water (or other chemicals) apparently attacked particles of other materials embedded in the copper. The U.S. NAVY reported that copper has a shortened life when copper pipes are subjected to elevated temperatures. In the Official NAVY publication "The Navy Civil Engineer", page 43, Spring, 1975 an article states: "If water temperatures in excess of 140° are required, then the only practical solution to the problem is substitution of 90-10 cupro-nickel (90% copper-10% nickel) tubing and fittings "- - - . "

Aluminum became popular as solar heat collector material. But, in some cases, the aluminum failed. Anti-corrosion materials were resorted to by some. But, the cost was increased. If a careful balance between alkalinity and acidity was not maintained, some solar heat collectors were short-lived.

Thomason & Thomason solved the problems by inventing the open-flow solar collector, sometimes called the "trickle-flow" collector (U.S. Pat. Nos. 3,145,707; 3,215,134; 3,270,739, etc.). Water is pumped to the top and flows down the valleys of corrugated, embossed aluminum collector absorber sheets. The surfaces are protected against corrosion by high-quality coatings. Nevertheless, coatings can deteriorate after many years of usage and leave the collector surface subject to corrosion.

The present invention makes it relatively easy to protect copper collectors, steel collectors, aluminum tube collectors and others, and also to prolong the life of high-quality Thomason open-flow, trickle-flow, collectors (known as Thomason "SOLARIS" collectors).

The "pillow" or quilted blanket-like device of the present invention may be of low-cost material such as vinyl plastic, butyl rubber, polyethylene or other, not generally affected by acids or alkalais or neutral liquids or gases. The device may contain large amounts of liquid inside of itself to thereby store large quantities of heat therein, releasing that heat to the other material (pool water, for example). And yet, the device can be made to deliver large quantities of heat, rather rapidly, to the surrounding other material (pool water, or other). By making the quilted device somewhat large, it holds a large quantity of liquid (or gas) inside and also has very large surfaces to transfer the heat to the other surrounding liquid or gas. It could be made in a pillow-like form, if desired. By desired proportioning the device may contain hundreds or thousands of gallons of liquid (or gas). It may cover the pool bottom only, or it may extend up along the walls. Or, it may be used along the walls only.

The safety feature (a quilt or water bag to protect divers and swimmers), and the beauty of a green, yellow, red, white or blue pool bottom, plus the velvety smooth touch for swimmers, provide numerous virtues. Ease of cleaning also is a virtue.

IN THE DRAWING

Figure 1:
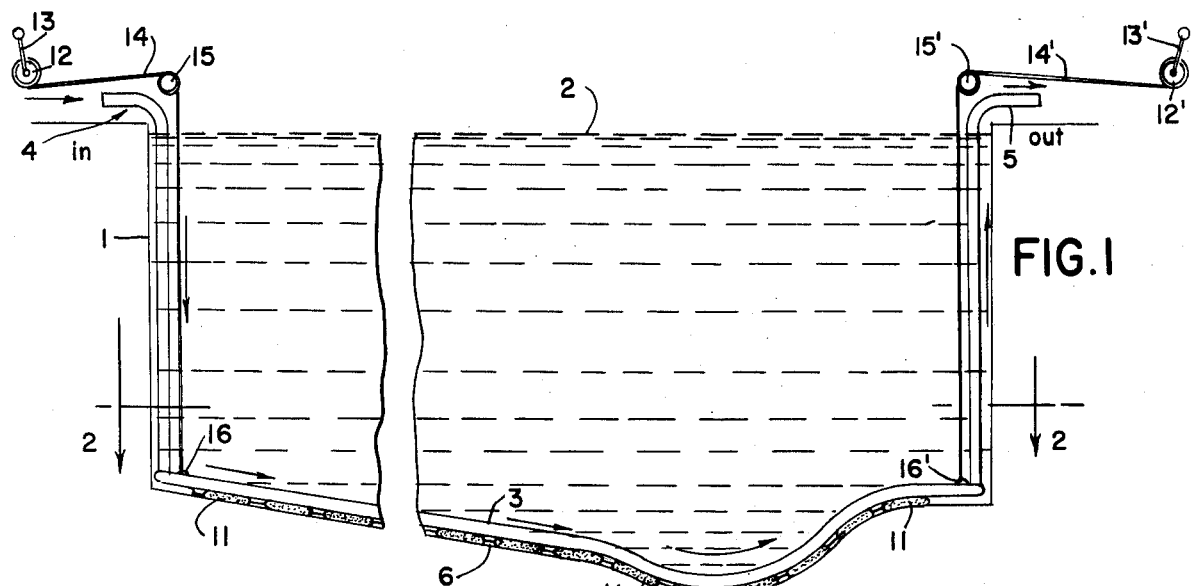
FIG. 1 is a cross-sectional view through a pool, along line 1—1 of FIG. 2, showing the present invention.
Figure 2:
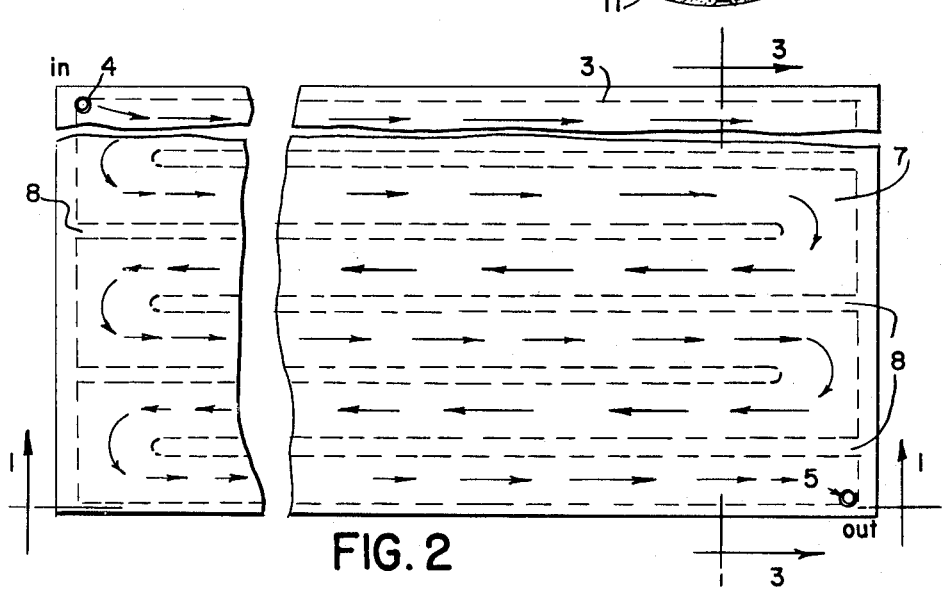
FIG. 2 is a plan view of the present device, along line 2—2 of FIG. 1.

Container 1 (a swimming pool, for example) may be substantially filled with liquid to level 2. Adjacent to the bottom a "pillow" or quilted-like device 3 has an inlet 4 and an outlet 5. Liquid (or a gas) from outlet 5 is circulated to a heat-producing device (a solar heat collector, a furnace, or other) where the fluid is warmed. The warmed fluid is returned through inlet 4 to warm the fluid in device 3. Warmed device 3 warms liquid (or a gas) in container 1.

The heat is provided where needed, at the bottom 6. It warms the fluid above. If device 3 has very large surface areas, the heat is released rapidly to fluid 2 above. The fluid in device 3 gives up its heat rather quickly and is thereby cooled, ready for picking up another "load of heat" as it returns to the solar heat collector or other source of heat. A large quilted-like device has large surface areas in proportion to the quantity of liquid inside.

If a slower and more gradual release of heat is desired, the surface area of device 3 may be reduced in relation to the quantity of fluid it contains (e.g. a pillow-like device containing a large volume of fluid and a smaller surface area).

The upper surface of device 3 may be colored. If so, solar energy that shines through the fluid above will be converted to heat to help warm the fluid in device 3, as well as the fluid thereabove. Therefore, device 3 may be a solar heat collector itself.

Thus, device 3 serves as a heat-exchanger, and also as a heat storage device, as well as a solar heat collection device. It may contain hundreds of gallons of liquid, or thousands of gallons. If may have hundreds or it may have thousands of square feet of heat-exchange surface area. If not only releases heat upwardly into fluid 2 above, but also to bottom 6 below. That stores heat at both places, to keep on warming the fluid above device 3. The pool does not cool down rapidly at sundown, if solar heat is the source of heat. Nor is the water over-warmed near the surface (overwarmed water near the surface would mean greater heat loss and unnecessary waste of energy).

Figure 4:
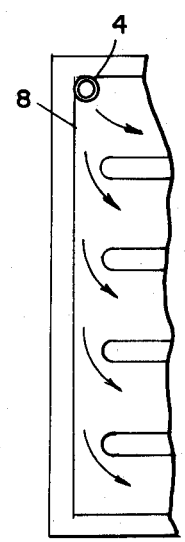
FIG. 4 is a modification wherein the fluid flows through the device in substantially parallel channels.
Figure 3:
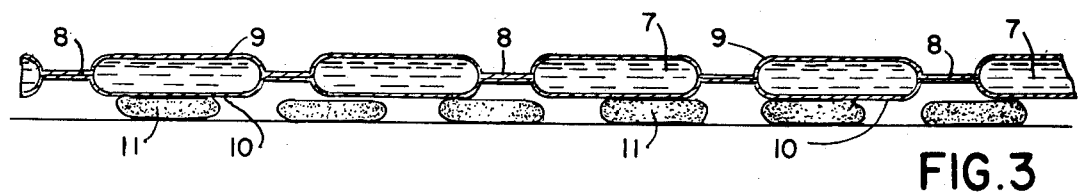
FIG. 3 is a cross-section along line 3—3 of FIG. 2.

Fluid flow in device 3 may be directed by channels 7 between sealed/areas 8. There, the quilted blanket-like device has its upper skin 9 secured to lower skin 10. Those channels may be arranged for serpentine flow as in FIG. 3, substantially parallel flow as in FIG. 4, or other.

If the device would tend to float up, weighting apparatus may be used at 11 (sand, for example, placed above, or below, or within the device).

EXAMPLE

Suppose device 3 substantially covers the floor of a modest-sized pool, 20 by 40 feet. The upper surface of a quilted, blanket-like device 3 would be about 800 sq. ft., and the bottom surface would also be 800 sq. ft. Therefore, 1,600 sq. ft. of surface area is there as heat-exchangers. If the blanket-like device averages 3 inches thick, device 3 contains 200 cubic feet or something like 1,500 gallon for heat storage. That is in addition to heat stored in the floor and heat stored in the thousands of fluid 2 above.

Plastics such as polyethylene (10 mil—very heavy gauge), sell at about 5 cents per sq. ft. (10 cents for double thickness for quilting—heat sealed, etc.). So, the basic materials would cost only $80 for a device 3 holding 1,500± gallons of fluid and having 1,600 sq. ft. of heat exchange surface—amazingly low in cost. Vinly plastic, butyl rubber, etc. would cost more. Or, plastic-coated fibers, Mylar-reinforced waterproofed material, etc. may be used.

It may be desired to use the device 3 as a pool cover at times. In order to simplify that operation simple windlas mechanisms 12, 12' having cranks 13, 13' are provided. Ropes, or plastic sheet, or such 14, 14' may be used, passing over pulleys or rollers at 15, 15' and attached to device 3 at 16, 16'. By winding up the windlases, device 3 will be brought to the water's surface where it may protect against children falling in and drowning, dust and debris falling into the pool, and escape of heat out through the top of the pool.

Or, the device 3 may be partially raised. In such position it serves somewhat as a "trampoline" for play activities. Or, it converts a deep pool quickly to a "shallow pool", safe for play by children.

Figure 5:
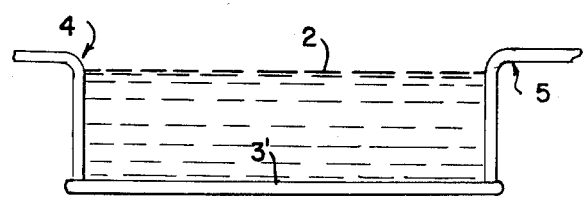
FIG. 5 is a modification for small pools.

FIG. 5 illustrates an embodiment such as the typical temporary backyard pool, or the pool that is installed above ground or such. In that case the device 3' may be a separate device, or it may be an integral part of the plastic or fabric bottom or side of the pool.

If the device forms a wall of the pool (in FIG. 1 or FIG. 5) it also serves as a cushion to protect an underwater swimmer's head, knees, elbows, etc. against accidental injury. It also collects solar energy coming in from a sun that may be low in the sky.

I claim:

1. In a pool or similar container of liquid having side and a bottom, heat exchanger—heat storage and pool-safety apparatus located adjacent to the bottom of the pool or similar container, said heat exchanger and heat storage apparatus comprising substantially liquid-tight upper and lower skin members substantially sealed to each other at limited areas in a quilted-like pattern defining areas for storage of warmed or cooled fluid and forming passages for flow or fluid through those areas, an inlet connection for introduction of warm or cool fluid to said areas for storage and circulation therethrough, an outlet connection for exit of fluid from said areas, said heat exchanger-heat storage—safety apparatus serving to reduce injuries to pool users, serving as heat storage apparatus when filled, and serving as a heat exchanger to impart heat to the liquid in the pool when the temperature of the fluid in said apparatus exceeds that in the pool, or to extract heat when the temperature of the fluid in said apparatus is lower than that in the pool.

2. A device as in claim 1 wherein said device has an upper and a lower skin, and means at least semi-sealing said upper and lower skins of said device to form a quilted, blanket-like pattern.

3. A device as in claim 1 wherein said device has an upper and a lower skin, and means substantially sealing said upper and lower skins to provide fluid passages for heat storage and heat transfer fluid.

4. A device as in claim 3 wherein said passages are formed in serpentine fashion.

5. A device as in claim 3 wherein said passages are formed as parallel passage.

6. A device as in claim 1 and means to substantially prevent floation of said device.

7. A device as in claim 6 wherein said means comprises a sand-like material attached to said device.

8. A device as in claim 1 wherein said pillow-like device is soft and flexible to absorb an impact such as a diver's head or elbow or knee-cap and minimize injury to the swimmer or diver.

9. A device as in claim 1 wherein said device is colored to intercept solar energy striking its surface and to warm fluid in said device, thereby serving as a solar heat collector.

10. A device as in claim 1 wherein said device is colored to intercept solar energy and collect solar heat to warm fluid above said device.

11. A device as in claim 1 wherein said device serves as a partial pool liner for a sidewall.

12. A device as in claim 1 wherein said device is installed as an integral part of the bottom or a side of a pool.

13. A device as in claim 1 and apparatus connected to said device to raise it to the surface of the pool water, or partially to the surface, to serve as a "trampoline-like" blanket for play, or as a pool cover, or to make the deep pool area shallower for safety.

* * * * *